(12) United States Patent
Miyajima et al.

(10) Patent No.: US 7,556,318 B2
(45) Date of Patent: Jul. 7, 2009

(54) VEHICLE SEAT AND METHOD FOR MANUFACTURING THE SAME

(75) Inventors: Iwao Miyajima, Lincoln, NE (US); Yoshio Tanaka, Lincoln, NE (US)

(73) Assignee: TS Tech Co., Ltd. (JP)

( * ) Notice: Subject to any disclaimer, the term of this patent is extended or adjusted under 35 U.S.C. 154(b) by 158 days.

(21) Appl. No.: 11/529,103

(22) Filed: Sep. 28, 2006

(65) Prior Publication Data

US 2008/0079305 A1    Apr. 3, 2008

(51) Int. Cl.
    *A47C 7/24* (2006.01)
(52) U.S. Cl. ............................. 297/452.59; 297/440.21
(58) Field of Classification Search ............. 297/218.1, 297/218.5, 452.29, 452.38, 452.55, 452.58, 297/452.59, 440.2, 440.21, 440.22, 218.3, 297/252.18, 248; 29/91, 91.1; 296/DIG. 5; 280/DIG. 5
    See application file for complete search history.

(56) References Cited

U.S. PATENT DOCUMENTS

| | | | | |
|---|---|---|---|---|
| 2,673,600 A | * | 3/1954 | Cramer | 297/452.59 |
| 4,682,817 A | * | 7/1987 | Freber | 297/408 |
| 5,048,894 A | * | 9/1991 | Miyajima et al. | 297/452.11 |
| 5,067,773 A | * | 11/1991 | Koa | 297/452.17 |
| 5,121,963 A | * | 6/1992 | Kwasnik et al. | 297/227 |
| 6,896,324 B1 | * | 5/2005 | Kull et al. | 297/216.1 |
| 7,264,298 B2 | * | 9/2007 | Cover | 296/102 |
| 2007/0205649 A1 | * | 9/2007 | Hanson et al. | 297/452.58 |

FOREIGN PATENT DOCUMENTS

| | | | |
|---|---|---|---|
| GB | 2011253 A | * | 7/1979 |
| JP | 5-18397 | | 3/1993 |
| JP | 5-21749 | | 3/1993 |
| JP | 5-131877 | | 5/1993 |
| JP | 8-252144 | | 10/1996 |
| JP | 2000-83755 | | 3/2000 |

* cited by examiner

*Primary Examiner*—David Dunn
*Assistant Examiner*—Patrick Lynch
(74) *Attorney, Agent, or Firm*—Schiff Hardin LLP (57) ABSTRACT

A seat comprises a seat back including a back plate, a cushion member arranged on the side of a seating face of the back plate, a superficial skin member covering the cushion member from the side of the seating face. The back plate includes a back face portion, a ridged portion, and a flange portion. A fringe portion of the superficial skin member is overlapped to a back face of the flange portion to be joined to the flange portion. A staple cover covering the fringe portion of the superficial skin member and a portion of the superficial skin member arranged on an outer peripheral face of the seat back is provided. The superficial skin member is arranged nearer a seating face than an outer peripheral end of the staple cover and extends to the outside beyond the outer peripheral end of the staple cover.

12 Claims, 9 Drawing Sheets

VEHICLE SEAT AND METHOD FOR MANUFACTURING THE SAME

BACKGROUND

The present invention relates to a vehicle seat which is used in a golf cart or the like and a method for manufacturing the same, and in particular to a vehicle seat whose appearance is improved to be more attractive to buyers, and a method for manufacturing the same.

As a small vehicle, a golf cart used on a golf course is known, and the golf cart is utilized for a golfer or the like to load a golf bag thereon and run. A seat which is provided in the golf cart and on which an occupant gets seated includes a seat cushion and a seat back which are formed by covering a cushion member such as urethane foam with superficial skin member. The seat back is provided so as to be generally seen clearly from the front and back of the golf cart.

Figure 9:
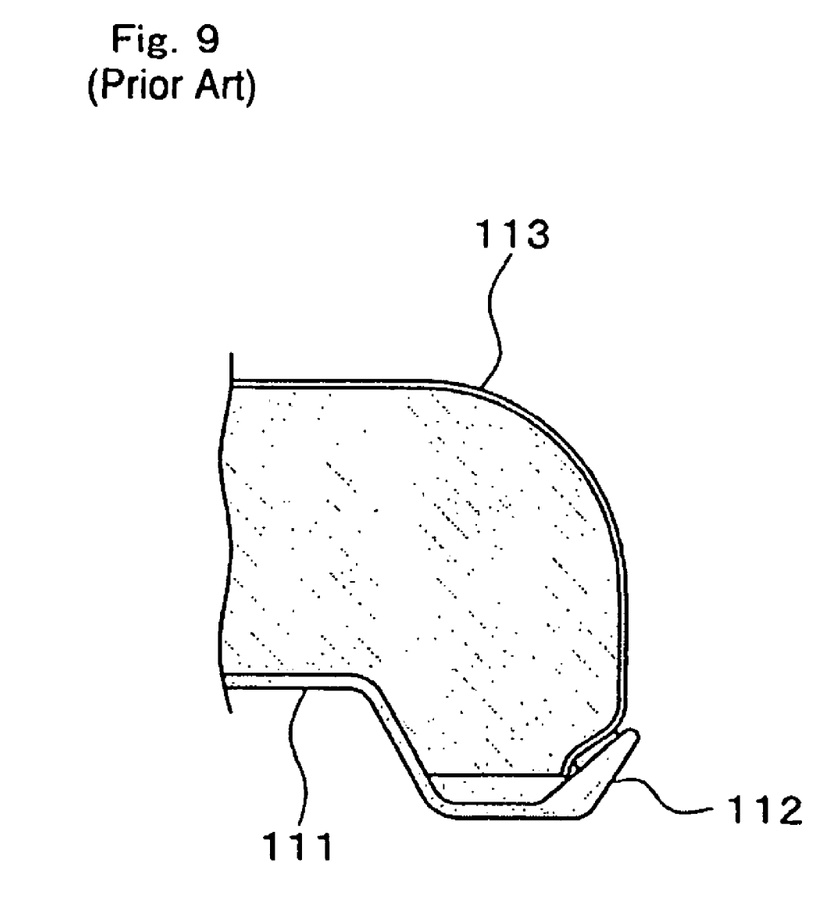
FIG. 9 is a partially enlarged sectional view of a seat back of a conventional example.

Conventionally, a superficial skin member forming a seat back of a vehicle seat used for such a golf cart is arranged so as to further cover a cushion member arranged on a seating face side of a back plate from the seating face side. FIG. 9 is a partially enlarged sectional view of a seat back of a conventional example. As shown in FIG. 9, for example, a fringe portion of a superficial skin member 113 is bonded on an inner peripheral face of an inclined portion 112 provided on an edge portion of a back plate 111 using an adhesive, such as a hot-melt adhesive.

However, in such a fringe treatment of a superficial skin member as shown in FIG. 9, the inclined portion 112 provided on the edge portion of the back plate 111 is treated so as to be extended to an outer peripheral side beyond the superficial skin member 113, as seen from a seating face side of the seat back. However, this creates a poor appearance, since a distal end of the edge portion of the back plate 111 or a space between the same and the superficial skin member 113 is seen from the seating face side of the seat back.

Additionally, it is known, e.g., from patent document JU-A-05-18397(page 4 and FIG. 1), that for fixing a fringe of the superficial skin member to a back face of a seat back of a vehicle seat, a plurality of resin clips can be arranged on a back face of a fringe portion of a superficial skin member, and the resin clips are inserted and fixed to an end portion of a back.

However, as disclosed in this document, since the fringe portion of the superficial skin member is not covered and resin clips are sewn on the fringe portion, a sutured line of the resin clips is exposed to a back face side of a seat back, which results in a poor appearance. All wrinkles or corrugations on the superficial skin member are exposed to the outside, which also results in a poor appearance. Furthermore, the design of this patent document requires time-consuming work for sewing the resin clips on.

When a superficial skin member extending from a seating face of a seat back to a back face thereof is joined to an edge portion of a back plate by stapling, the staples or the fringe portion of the superficial skin member is exposed on side faces or the back face of the seat back, if the state is left as it is, which results in a poor appearance. Therefore, such a treatment as providing a covering member which covers the staples is required in order to prevent the poor appearance. However, in a seat back of a seat for a golf cart, a treatment or a constitution performed for preventing appearance deterioration is not known.

It is possible to make a fringe treatment utilizing the staple unnecessary by integral foam molding of a superficial skin member with a cushion member, but there is such a problem that, since a seat manufactured by the integral foam molding is hard and has bad cushioning performance, it is uncomfortable.

In view of the above-described problem, an object of the present invention is to provide a vehicle seat and seat back for a golf cart with an appearance more attractive for marketing, with enhanced riding comfort by offering sufficient cushioning performance of the seat back, and a method for manufacturing the same.

SUMMARY

According to a vehicle seat according to various embodiments of the present invention, the above problem is solved by a vehicle seat comprising a seat back which is formed by covering a cushion member arranged on the side of a seating face of a back plate with a superficial skin member from the side of the seating face and performing fringe treatment to the superficial skin member on the opposite side of the back plate from the seating face, wherein, the back plate includes a back face portion arranged on a back face side of the cushion member, a ridged portion formed to be projected to the back face side of the seat back along an outer periphery of the back face portion, and a flange portion formed in an extending manner so as to be inclined from an outer peripheral end of the ridged portion toward the back face side, a covering member which covers a fringe treated portion obtained by treating a fringe of the superficial skin member and a superficial skin member portion at an outer peripheral face position of the seat back is provided, the covering member includes a plurality of divided parts arranged on an upper portion of the back face of the seat back, a lower portion thereof, and side portions thereof, the covering member is arranged so as to be positioned nearer a central portion of the seat back than the superficial skin member portion at the outer peripheral face position of the seat back.

Thus, according to various embodiments of the present invention, the covering member which covers the joined portion of the back plate and the superficial skin member is provided on the seat back of the vehicle seat. Therefore, the fringe portion of the superficial skin member can be covered over, and the seat back is more attractive from a marketing standpoint.

The covering member has a shape of covering one portion of the superficial skin member arranged to the outer peripheral face of the seat back. That is, a portion of the superficial skin member near the joined portion, which extends from the back face to the outer peripheral face of the seat back can be relatively widely covered with the covering member. Therefore, wrinkles or corrugations of the superficial skin member occurring near the joined portion are not exposed to the outside, and the appearance of the seat back is enhanced.

In various embodiments of the present invention, the superficial skin member arranged nearer the seating face side than the outer peripheral end of the covering member is provided so as to extend outwardly beyond the outer peripheral end of the covering member. Therefore, the covering member is hid in the superficial skin member to be invisible from the seating face side, and the fringe portion of the superficial skin member is never seen from a gap between the covering member and the superficial skin member. Thus, the appearance of the seat back is enhanced.

In various embodiments of the present invention, the flange portion is provided over all circumferences of the back plate, and the covering member is arranged over a whole periphery of the back face portion of the back plate in a strip-shaped manner corresponding to the flange portion. It is preferable for the covering member to be formed to have a plurality of the divided parts arranged on the upper portion of the back face, the lower portion thereof, and the side portion thereof of the seat back.

Since the flange portion and the covering member described above are provided over the all circumferences of the back plate in this manner, the fringe portion of the superficial skin member is finished with a high quality appearance over the all circumferences of the back plate. Additionally, by dividing the covering member into a plurality of parts to mold the same, the individual parts are made small, and a molding apparatus for molding the same or the like can be reduced in size.

More specifically, the fringe of the superficial skin member is joined to the back plate by stapling the same to the back face side of the flange portion. The fringe treatment utilizing stapling in this manner is performed when the seat back is formed not by integral foam molding of the superficial skin member and the cushion member but by covering the cushion member with the superficial skin member. Thus, the cushioning performance is better than that obtained by integral foam molding, and riding comfort is enhanced, which is desirable.

The covering member is joined to the back plate by a blind rivet. Since the covering member can be joined to the back plate only by driving a blind rivet from the outside in this manner, fixing work of the covering member is made easy, which is desirable.

Further, according to embodiments for a method for manufacturing a vehicle seat, the above problem is solved by a method for manufacturing a vehicle seat comprising a seat back which is formed by covering a cushion member arranged on the side of a seating face of a back plate with a superficial skin member from the side of the seating face and performing fringe treatment to the superficial skin member on the opposite side of the back plate from the seating face, the method comprising a first step of arranging the cushion member on the back plate, a second step of performing fringe treatment of covering the cushion member with the superficial skin member and joining a fringe of the superficial skin member to the back plate after the first step, and a third step of covering a fringe treated portion obtained by treating the fringe of the superficial skin member and a superficial skin member portion at an outer circumference side face position of the seat back with a covering member and arranging the covering member so as to be positioned nearer a central portion of the seat back than the superficial skin member portion at the outer peripheral face position of the seat back.

According to the vehicle seat of various embodiments of the present invention, a vehicle seat where the fringe portion of the superficial skin member joined to the back plate and wrinkles or corrugations of the superficial skin member around the joined portion can be covered over by the covering member can be obtained, which enhances the appearance of the seat back.

Further, according to various embodiments of the vehicle seat of the present invention, since the superficial skin member on the side of the seating face extends outwardly beyond the outer peripheral end of the covering member, the covering member is hid in the superficial skin member to be invisible when the seat back is seen from the side of the seating face. The fringe portion of the superficial skin member is never seen from a gap between the covering member and the superficial skin member. Thus, the appearance of the seat back is enhanced.

Further, according to various embodiments of the vehicle seat of the present invention, by dividing the covering member into a plurality of parts to mold them, a molding apparatus for forming or the like can be reduced in size.

According to the method for manufacturing a vehicle seat, a vehicle seat having the above feature can be manufactured.

BRIEF DESCRIPTION OF THE DRAWINGS

The invention is illustrated below by various embodiments illustrated in the drawing figures and detailed description below.

FIG. 8($a$) is a partially enlarged sectional view of a joined portion of the staple cover (a sectional view taken along line B-B in FIG. 3);

FIG. 8($b$) is a partially enlarged sectional view of the joined portion of the staple cover (a sectional view taken along line C-C in FIG. 3), and;

DETAILED DESCRIPTION OF THE PREFERRED EMBODIMENTS

An embodiment of the present invention will be explained below with reference to the drawings. Since members, arrangements, or the like explained below do not limit the present invention, they can be variously modified within the scope of the present invention.

Figure 1:
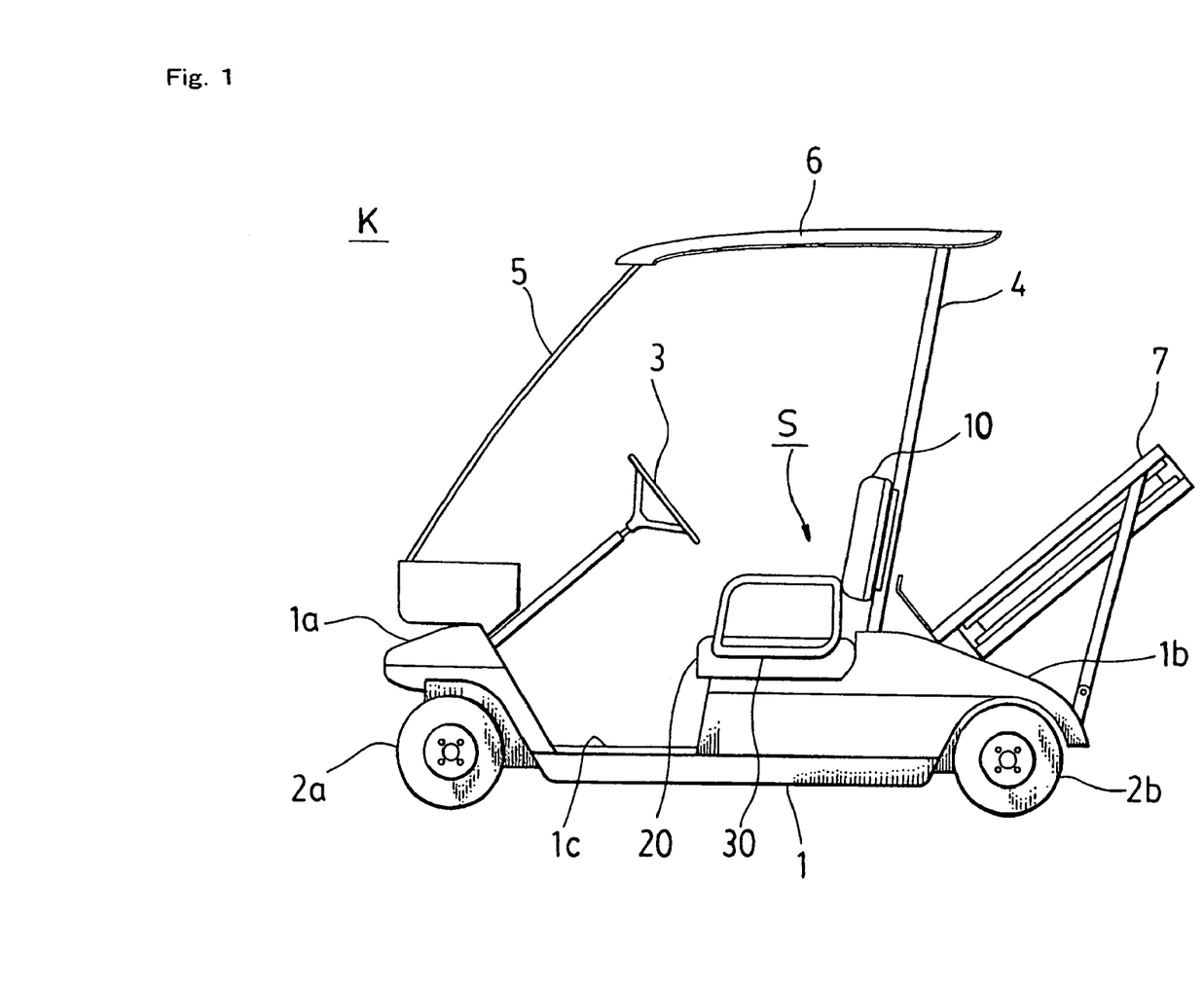
FIG. 1 is a side view of a golf cart according to an embodiment.

A seat S for a golf cart according to an embodiment of the present invention is preferably used, for example, as a seat for a golf cart K shown in FIG. 1. The golf cart K is used for two occupants and comprises a vehicle body 1 including a front cowl 1$a$, a rear cowl 1$b$, and a vehicle floor 1$c$. The seat S for two occupants is provided slightly rearward of a central portion of the vehicle body 1. In the embodiment, the seat S is for two occupants, but the seats S for two occupants may be arranged in two or more rows.

The golf cart K includes front tires 2$a$ and rear tires 2$b$ provided to a front portion and a rear portion of the vehicle body 1, a steering wheel 3 provided in front of the seat S, a rear frame 4 which is provided behind the seat S erectly from a main frame of the vehicle body 1, a front window 5 provided above the front cowl 1$a$, a roof 6 connected to an upper end of the front window 5 and bridged above the vehicle body 1, a loading space 7 provided behind the seat S and the rear frame 4, and the like.

Figure 2:
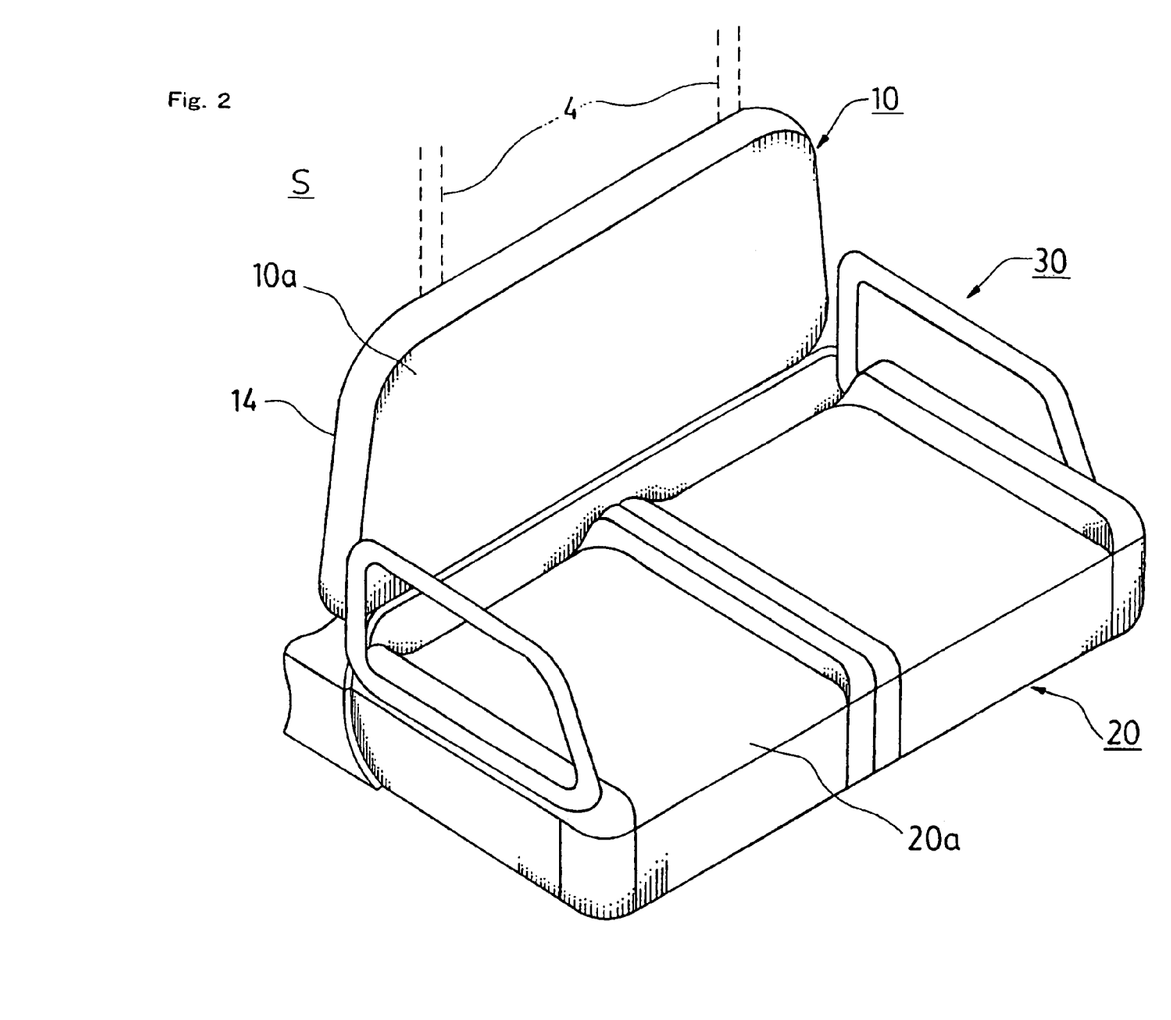
FIG. 2 is a perspective view of a seat for the golf cart according to the embodiment.

As shown in FIG. 1 and FIG. 2, the seat S includes a seat back 10 and a seat cushion 20 respectively formed to have a width for two occupants, and armrests 30 arranged to both left and right sides of the seat cushion 20. The seat S is provided such that a seating face 10$a$ of the seat back 10 and a seating face 20$a$ of the seat cushion 20 are set at predetermined positions and angles suitable for seating.

The seat back 10 is supported by a main frame of the vehicle body 1 via the rear frame 4 fixed to the back face side of the seat back by bolts or the like. The seat cushion 20 is placed on a seat frame (not shown) provided below the seat cushion, and the seat cushion 20 is fixed on the seat frame by bolts or the like to be supported by the main frame of the vehicle body 1 via the seat frame.

The seat back 10 and the seat cushion 20 are formed such that four corners thereof are rounded, as shown in FIG. 2. The seating faces 10a and 20a are formed to have appropriately recessed shapes such that, when two occupants are seated on the seating faces side by side, their buttocks or backs are properly dropped for stable seating.

The armrest 30 can support an occupant's elbow when he/she is seated, and it is formed to have a size and a thickness which an occupant comfortably grasps when getting on and off. The armrest 30 can be integrally made from, for example, resin or metal, or it can be formed by arranging a pad member on a surface of a frame which is a core member and covering a surface of the pad member with a superficial skin member.

Next, the construction of the seat back 10 of the embodiment will be explained.

Back views and sectional views of the seat back 10 are shown in FIG. 3 to FIG. 6. As shown in these figures, main components of the seat back 10 include a back plate 11 provided on the back face of the seat back, a cushion member 12 arranged on a seating face side of the back plate 11, a superficial skin member 13 arranged on a surface of the cushion member 12, and a staple cover 14 as a covering member attached so as to cover joined portions of the back plate 11 and the superficial skin member 13 from the back face side.

Figure 4:
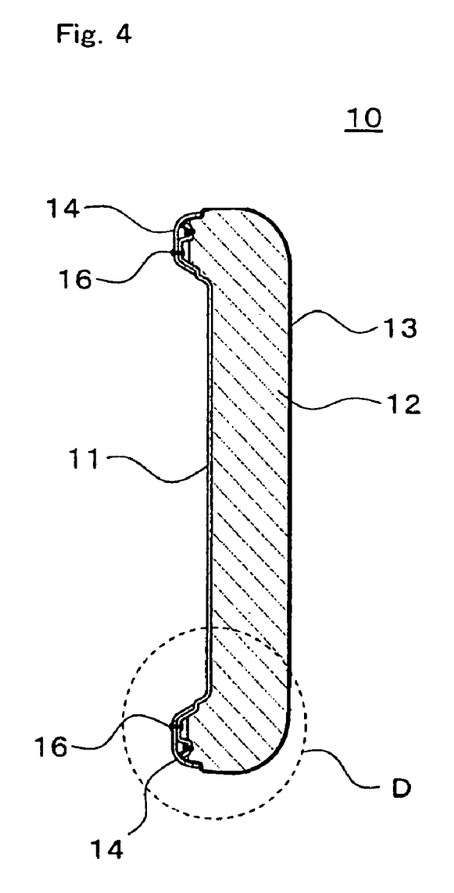
FIG. 4 is a sectional view of the seat back according to the embodiment (a sectional view taken along line A-A in FIG. 3)

The back plate 11 of the embodiment is formed by injection molding of thermoplastic resin such as PP (polypropylene), or the like. A plan view shape of the back plate 11 is formed from a shape which corresponds to a shape of the seat back 10 seen from behind, and the back plate 11 is formed to have a contour size slightly smaller than that of the seat back 10 in the embodiment, as shown in FIG. 4. The back plate 11 may be formed using ABC resin, fiber reinforced resin which is reinforced with glass fiber, carbon fiber, or the like.

Figure 5:
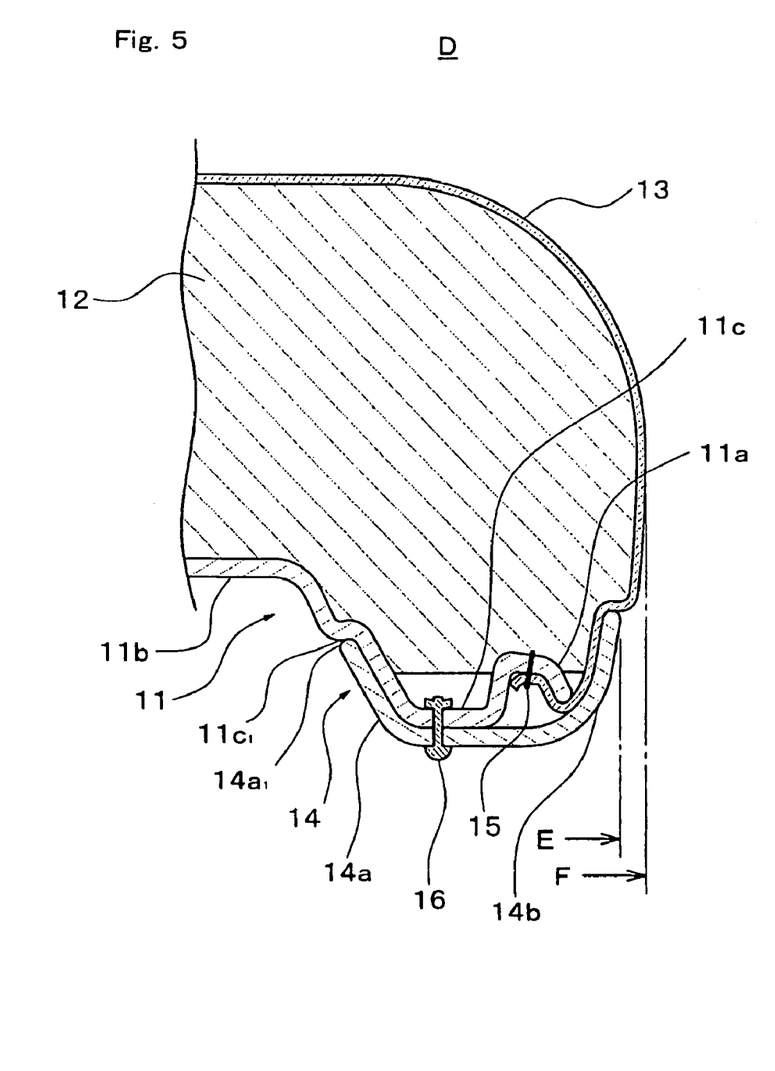
FIG. 5 is a partially enlarged view of a region C in FIG. 4.

As shown in FIG. 5, the back plate 11 is formed at a central portion thereof with a back face portion 11b arranged on a back face side of the cushion member 12, and a ridged portion 11c is formed around a whole circumference so as to be projected to a back face side of the seat back 10 along an outer periphery of the back face portion 11b. A flange portion 11a is formed to extend from an outer periphery end of the ridged portion 11c. Specifically, in the flange portion 11a, a proximal end thereof is formed by bending an inclined face of an outer peripheral portion of the ridged portion 11c, namely, an inclined face extending in a direction of the seating face, toward the outer periphery, while a free end thereof forms an inclined face inclined toward the back face of the seat back 10.

In the embodiment, the flange portion 11a having such a shape is provided over the whole peripheral edge of the back plate 11. A fringe of the superficial skin member 13 is caused to abut to a back face side of the flange portion 11a to be joined by staples 15.

Figure 3:
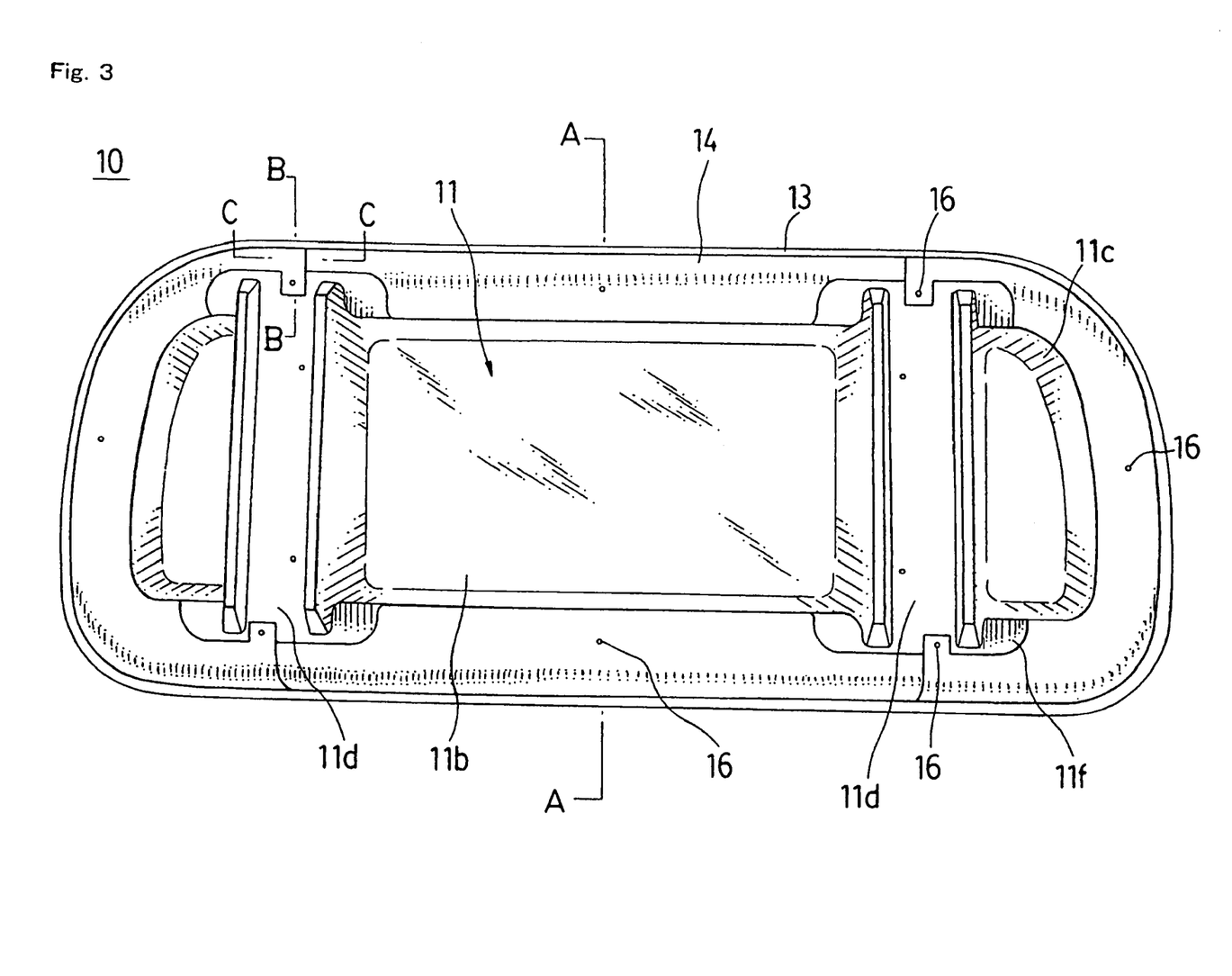
FIG. 3 is a back view of a seat back according to the embodiment.

In the embodiment, two linear frame fixing portions 11d for fixing the rear frame 4 are formed at the back face portion 11b of the back plate 11. As shown in FIG. 3, the frame fixing portion 11d is formed to be ridged so as to be projected from a surface of the back face portion 11b toward the back face, and upper and lower ends thereof are respectively connected to the ridged portion 11c. Two ribs in approximately parallel with each other are formed in a projecting manner toward a back face of the frame fixing portion 11d. Thus, the rear frame 4 can be fitted between the ribs to be positioned and fixed by bolts or the like.

The cushion member 12 is formed from resin foam such as urethane foam. Besides the urethane foam, for example, PP (polypropylene foam), PE (polyethylene foam), or the like may be used.

As the superficial skin member 13, a seat member made from waterproof material such as PVC (polyvinyl chloride resin) is used. The superficial skin member 13 of the embodiment is processed into a three-dimensional shape by a second forming process such as vacuum forming and then arranged on the surface of cushion member 12 in order to be fitted to an outer shape of the seat back 10.

In this manner, in the seat back 10 of the embodiment, the superficial skin member 13 is prevented from separating from the cushion member 12 by covering the cushion member 12 formed in a predetermined shape with the superficial skin member 13 processed to be fitted to the cushion member 12 in advance and stapling a fringe portion of the superficial skin member 13 instead of performing integral foam molding of the cushion member 12 and the superficial skin member 13.

Generally, when the cushion member and the superficial skin member are formed utilizing the integral foam molding, a molded product becomes relatively hard, which cannot offer cushion performance of the cushion member sufficiently. On the other hand, when the superficial skin member 13 is simply covered on the cushion member 12 instead of performing integral foam molding, as shown in the embodiment, the cushion performance becomes better than that of the integral foam molded product. Therefore, riding comfort is enhanced.

The staple cover 14 serving as a covering member is formed by injection molding of thermoplastic resin such as PP (polypropylene) like the back plate 11. The staple cover 14 is attached over a whole outer periphery of the back plate 11 in a strip-shaped manner so as to cover most of the above-described ridged portion 11c, the flange portion 11a, and the whole fringe portion of the superficial skin member 13 joined to the flange portion 11a.

As shown in FIG. 5, the staple cover 14 is formed to have a recessed shape in section and it is formed in a curved manner such that a central portion thereof projects toward the back face of the seat back 10. Specifically, an inner peripheral portion 14a of the staple cover 14 (which is positioned to a central portion of the seat back) is formed to have an angle and a round face where it can abut on an area of the ridged portion 11c of the back plate 11 extending from an inner peripheral portion thereof to the back face thereof without including any gap. An outer peripheral portion 14b of the staple cover 14 (which is positioned outside of the seat back) is extended outwardly beyond a free end of the flange portion 11a, and it is formed in a curved manner such that a distal end thereof is directed toward the seating face of the seat back 10.

A step portion corresponding to a thickness size of the staple cover 14 is formed on a portion of the inclined face 11c1 on an inner periphery of the ridged portion 11c which abuts on an end portion 14a1 of the staple cover 14 such that when the staple cover 14 is attached to the back plate 11, the former becomes flush with the latter. Therefore, the staple cover 14 can be positioned to an attaching position by causing the inner peripheral portion 14a to abut on the ridged portion 11c and fitting the end portion 14a1 of the staple cover 14 to the step portion. The positioned staple cover 14 is joined to the back plate 11 utilizing blind rivets 16 made from resin at a predetermined joining position (a top of the ridged portion 11c in the embodiment).

In the embodiment, in a state that the staple cover 14 is attached to the back plate 11 in this manner, the outer peripheral portion 14*b* of the staple cover 14 is extended to an outer peripheral position beyond the free end of the flange portion 11*a*. Therefore, all joined portions where the fringe portion of the superficial skin member 13 is caused to abut on the back face side of the flange portion 11*a* to be stapled and joined thereto are covered over from the back face side. Thus, the staples used for joining and the fringe of the superficial skin member 13 are prevented from being exposed to the back face side.

Figure 6:
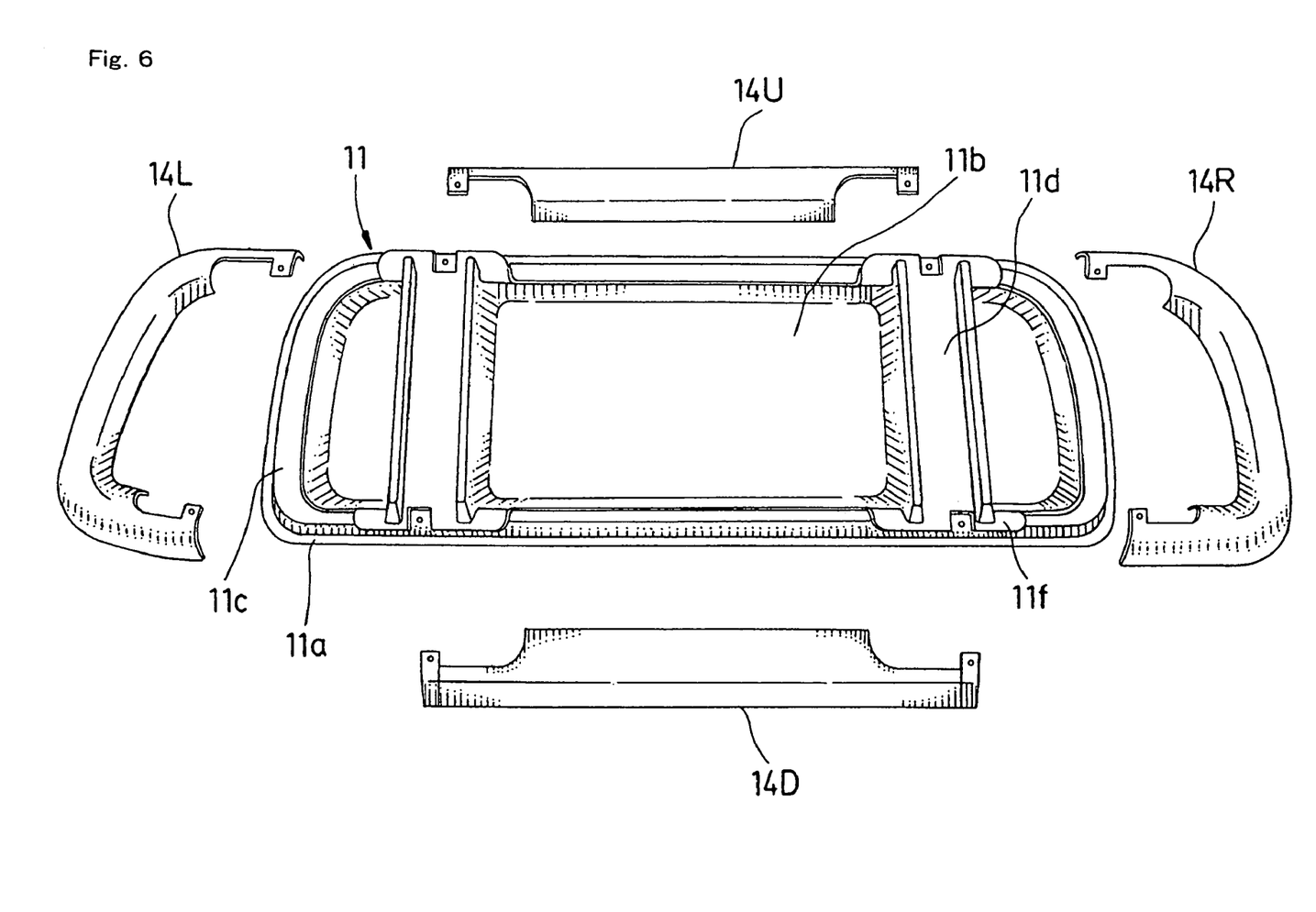
FIG. 6 is an exploded explanatory view of a staple cover and a back plate according to the embodiment.

In the embodiment, since such a construction that the staple cover 14 is provided over the whole outer periphery of the seat back 10 having a width for two occupants is employed as described above, the staple cover 14 of the embodiment is molded as four divided parts as shown in FIG. 6 and assembled for use. Specifically, the whole staple cover 14 is divided into three along vertical dividing lines, so that it is divided into four parts of a left part 14L and a right part 14R each of which includes a short side portion positioned on the left and right, and an upper part 14U and a lower part 14D each of which includes a long side portion positioned above and below, and they are respectively molded as independent parts.

The left part 14L and the right part 14R are respectively arranged to left and right portions of the back face of the seat back 10. The upper part 14U and the lower part 14D are respectively arranged to an upper portion and a lower portion of the back face of the seat back 10. In this manner, since the large staple cover 14 having a width for two occupants is molded in a four-dividing manner, and the divided parts are assembled for use in the embodiment, a molding apparatus for molding or the like can be reduced in size. The number of divisions and the positions of dividing lines are not limited to the above-described number and the positions and they can be modified.

Figure 7:
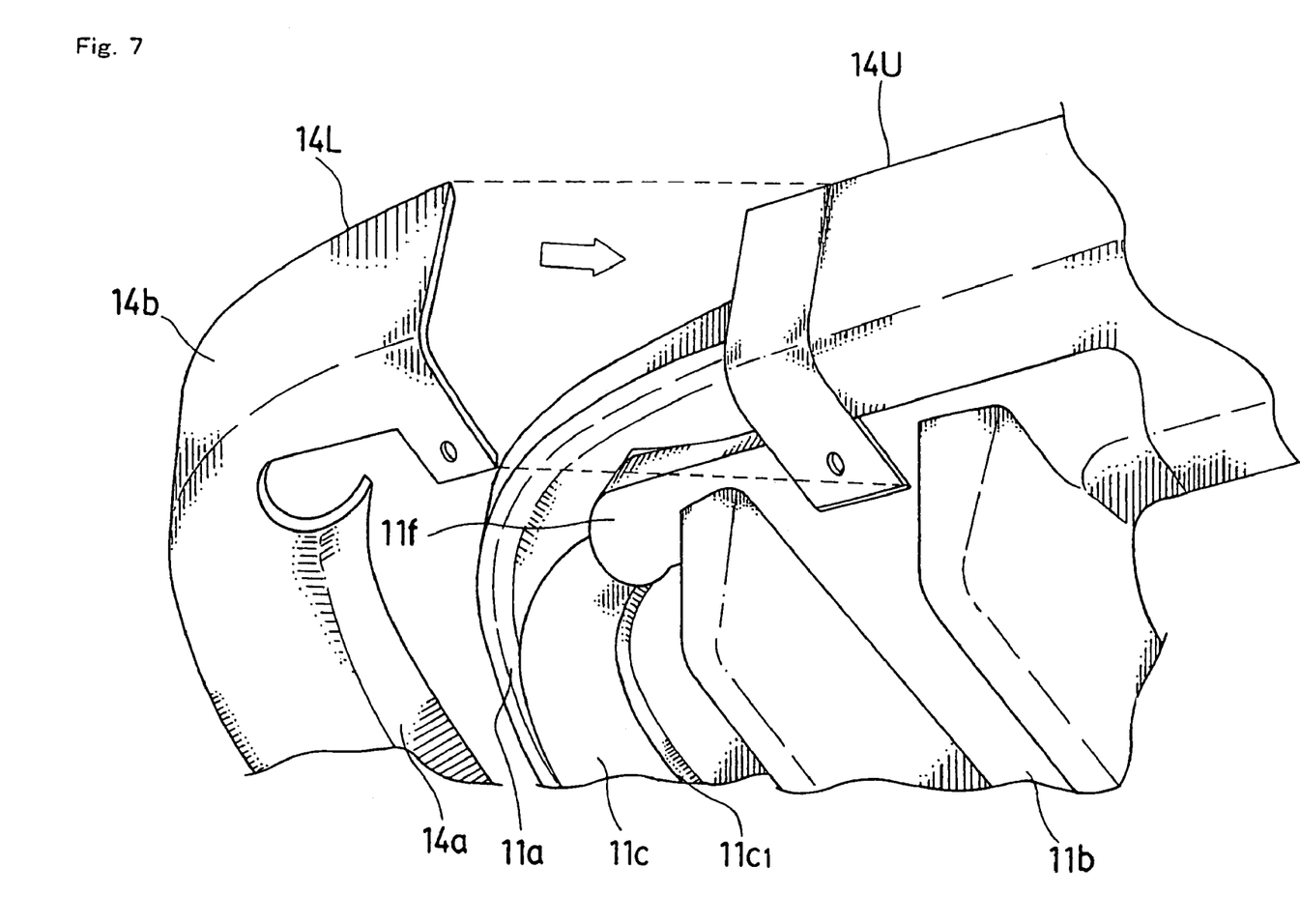
FIG. 7 is an explanatory view showing a method for joining the staple cover.
Figure 8:
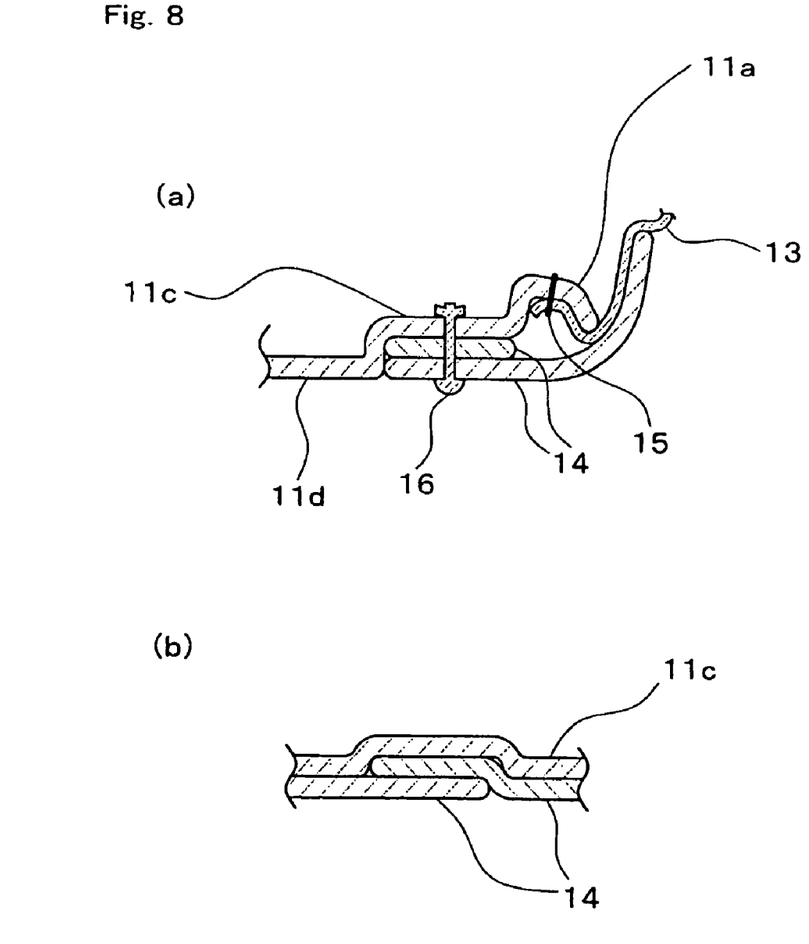

Each of the parts is provided at each end portion with a joining portion, and size setting thereof is performed such that joining portions of adjacent parts overlap with each other when they are attached to the back plate 11. FIG. 7 shows joining portions of the upper part 14U and the left part 14L. As shown in FIG. 7, when the staple cover 14 is attached to the back plate 11, the joining portions of the parts 14U and 14L are superimposed on each other to be caused to abut on the ridged portion 11*c*. By driving the blind rivet 16 made from resin from the outside to penetrate the joining portions stacked on the ridged portion 11*c*, the staple cover is attached to the back plate 11. Such a construction that end portions of adjacent staple covers 14 are fitted to each other to be joined may be employed. A sectional construction in the joining portions of the adjacent parts is shown in FIGS. 8(*a*) and 8(*b*). In FIGS. 8(*a*) and 8(*b*), the cushion member 12 is not shown.

As shown in FIG. 3, a total of eight blind rivets 16 for fixing the staple cover 14 to the back plate 11 is provided such that one is provided for each joining portion of adjacent parts and one is provided to an approximately central portion of each part. The blind rivet 16 provided to the joining portions of adjacent parts is used for both joining adjacent parts and joining the adjacent parts with the back plate 11 as descried above.

In the embodiment, as shown in FIG. 6 and FIG. 7, such size setting that the divided position of the staple cover 14, namely, the joining position of each part, is positioned at a connecting position of the ridged portion 11*c* and the frame fixing portion 11*d* is performed. That is, the joining position of adjacent parts is positioned between the two ribs provided to the frame fixing portion 11*d*. In such a construction, by fitting the rear frame 4 to the frame fixing portion 11*d* to fix the same, a joining portion of the staple cover 14, namely, the dividing line, can be covered with the rear frame 4. Therefore, the joining portion of the staple cover 14 is not exposed to the outside, and appearance is enhanced.

The staple cover 14 of the embodiment is formed in such a shape that a portion of the inner peripheral portion 14*a* thereof positioned near the connecting position of the ridged portion 11*c* and the frame fixing portion 11*d* has been cut, as shown in FIG. 7. On the other hand, a portion of the back plate 11 which is positioned near the connecting position of the ridged portion 11*c* and the frame fixing portion 11*d* and which is not covered with the staple cover 14 forms a portion 11*f* ridged from a portion surrounding the same by a thickness of the staple cover 14. That is, when the staple cover 14 is attached to the back plate 11, no step occurs, so that a flush face is achieved wholly and the appearance is enhanced.

The staple cover 14 of the embodiment is constructed such that no step occurs on the back face of the seat back 10 in the joining portions of adjacent parts. That is, in the embodiment, a lower side part and the ridged portion 11*c* are formed in a recessed shape by a thickness of an upper side part in the joining portions of adjacent parts, as shown in FIG. 8(*b*). Thereby, the increased thickness is accommodated in the recess, which results in flush face at the joined portion of the adjacent parts. As shown in FIG. 8(*a*), the surface of the frame fixing portion 11*d* and the surface of an uppermost part become flush with each other.

When such a construction is employed, even if the rear frames 4 are attached on the joined portions of the staple cover 14, the rear frames 4 are prevented from chattering due to a step. Thereby, the seat back 10 can be firmly fixed to the rear frames 4.

In the embodiment, the outer peripheral portion 14*b* of the staple cover 14 extends to the outside beyond the free end of the flange portion 11*a* which is a joined face of the back plate 11 and the superficial skin member 13 and to a position of the seating face side of the seat back. Therefore, the free end of the flange portion 11*a* is put so as to be opposed to the inner face of the curved portion of the outer peripheral portion 14*b* via the superficial skin member 13. The free end of the curved portion of the outer peripheral portion 14*b* which is an outer peripheral end of the staple cover 14 is further extended beyond the outer peripheral end of the flange portion 11*a* which is an outer peripheral end of the back plate 11 to the seating face side of the seat back.

When such a construction is employed, the superficial skin member 13 connected to the seating face side through a gap between the inner peripheral face of the curved portion of the outer peripheral portion 14*b* and the free end of the flange portion 11*a* is brought in pressure contact with the inner peripheral face of the outer peripheral portion 14*b* by an expansion force of the cushion member 12. On a side nearer the seating face from the free end of the outer peripheral portion 14*b*, since side faces of the seat back 10 are not held, the superficial skin member 13 and the cushion member 12 protrude outwardly beyond the free end of the outer peripheral portion 14*b*, namely, the outer peripheral end of the staple cover 14. That is, as shown in FIG. 5, a position of an arrow F showing an outer peripheral line of the superficial skin member 13 is positioned to the outside of a position of an arrow E showing an outer peripheral line of the staple cover 14.

In this manner, in the staple cover 14 of the embodiment, a distal end portion of the outer peripheral portion 14*b* which is the outer peripheral end of the staple cover (the arrow E in FIG. 5) is positioned to be set back from the outer peripheral line of the superficial skin member 13 seen from the seating face side (the arrow F in FIG. 5). Therefore, the staple cover 14 is never seen when the seat back 10 is seen from the seating face side, and the appearance is enhanced. Since the joined portion of the fringe portion of the superficial skin member 13 and the back plate 11 is covered with the staple cover 14, the fringe portion of the superficial skin member 13 and the staples are never seen from the back face side or the side face side as well as from the seating face side.

In the embodiment, a portion of the periphery of the flange portion 11*a* stapled with the superficial skin member 13 which extends from the back face of the seat back 10 to the side faces thereof is relatively widely covered with the staple cover 14 having an approximately channel sectional shape which is formed to project toward the back face of the seat back 10. Thereby, wrinkles or corrugations of the superficial skin member 13 occurring near the joined portion are hardly exposed to the outside, and the appearance is enhanced.

When a vehicle seat including a seat back which is formed by covering a cushion member arranged on a side of a seating face of a back plate with a superficial skin member from the side of the seating face direction and performing fringe treatment to the superficial skin member on the opposite side of the back plate from the seat cushion is manufactured, the following process including at least three steps is performed.

First, a first step of arranging a cushion member on a back plate is performed. Next, after the first step, a fringe treatment of covering the cushion member with a superficial skin member and joining a fringe of the superficial skin member to the back plate is performed (a second step). After the second step, a third step is performed. The third step is performed so as to cover a fringe treated portion obtained by treating the fringe of the superficial skin member and a superficial skin member portion of a seat back on a side of an outer peripheral face thereof with a covering member and arranging the covering member so as to be positioned nearer a central direction of the seat back than the superficial skin member portion of the seat back on the side of the outer peripheral face thereof. Details of respective contents of the first step to the third step have already been described. In the above-described manner, the vehicle seat is manufactured.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/ or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A vehicle seat comprising:
a seat back which comprises a superficial skin member that covers a cushion member, wherein the cushion member is on a front side of a back plate, the cushion member having a back face facing the back plate, the back plate having the front side facing the cushion member and a back side facing away from the cushion member, the superficial skin member having a fringe that receives a fringe treatment on the back side of the back plate, wherein, the back plate comprises:
a back face portion on the back face of the cushion member;
a ridged portion extending away from the back face of the cushion member along an outer periphery of the back face portion, and
a flange portion extending from an outer peripheral end of the ridged portion and being inclined with respect to the back face of the cushion member;
the vehicle seat further comprising:
a covering member which covers the fringe treatment of the superficial skin member such that a superficial skin member portion of the seat back is provided at an outer peripheral face position, the covering member comprising:
a plurality of divided parts on an upper portion of the seat back, a lower portion thereof, and side portions thereof, the covering member being positioned nearer a central portion of the seat back than the superficial skin member portion at the outer peripheral face position of the seat back;
wherein, the covering member is joined to the back plate by a blind rivet; and,
wherein the back plate comprises a frame fixing portion, wherein the blind rivet is inserted through the frame fixing portion, and wherein the frame fixing portion is formed so as to align with a member of a frame of a vehicle so as to conceal the blind rivet.

2. A vehicle seat according to claim 1, wherein:
the flange portion is provided over a whole periphery of the back plate, and
the covering member is arranged over a whole periphery of the back face portion of the back plate in a strip-shaped manner corresponding to the flange portion.

3. A vehicle seat according to claim 1, wherein the fringe treatment comprises staples that join the superficial skin member to the back plate.

4. A vehicle seat according to claim 1, wherein the flange portion has a terminal end, and wherein the fringe of the superficial skin member is between the cover member and the terminal end of the flange portion of the back plate.

5. A vehicle seat comprising:
a seat back which comprises a superficial skin member that covers a cushion member, wherein the cushion member is on a front side of a back plate, the cushion member having a back face facing the back plate, the back plate having the front side facing the cushion member and a back side facing away from the cushion member, the superficial skin member having a fringe that receives a fringe treatment on the back side of the back plate, wherein, the back plate comprises:
a back face portion on the back face of the cushion member;
a ridged portion extending away from the back face of the cushion member along an outer periphery of the back face portion, and a flange portion extending from an outer peripheral end of the ridged portion and being inclined with respect to the back face of the cushion member;

the vehicle seat further comprising:

a covering member which covers the fringe treatment of the superficial skin member such that a superficial skin member portion of the seat back is provided at an outer peripheral face position, the covering member comprising:

a plurality of divided parts on an upper portion of the seat back, a lower portion thereof, and side portions thereof, the covering member being positioned nearer a central portion of the seat back than the superficial skin member portion at the outer peripheral face position of the seat back; and, wherein the covering member is joined to the back plate by a first and second laterally spaced apart fasteners, wherein the back plate comprises first and second laterally spaced apart frame fixing portions, wherein the first fastener is inserted through the covering member and the first frame fixing portion, wherein the second fastener is inserted through the covering member and the second frame fixing portion, and wherein the first and second frame fixing portions are formed so as to align with members of a frame of a vehicle so as to conceal the first and second fasteners.

6. A vehicle seat comprising:

a seat back which comprises a superficial skin member that covers a cushion member, wherein the cushion member is on a front side of a back plate, the cushion member having a back face facing the back plate, the back plate having the front side facing the cushion member and a back side facing away from the cushion member, the superficial skin member having a fringe that receives a fringe treatment on the back side of the back plate, wherein, the back plate comprises:

a back face portion on the back face of the cushion member;

a ridged portion extending away from the back face of the cushion member along an outer periphery of the back face portion, and a flange portion extending from an outer peripheral end of the ridged portion and being inclined with respect to the back face of the cushion member;

the vehicle seat further comprising:

a covering member which covers the fringe treatment of the superficial skin member such that a superficial skin member portion of the seat back is provided at an outer peripheral face position, the covering member comprising:

a plurality of divided parts on an upper portion of the seat back, a lower portion thereof, and side portions thereof, the covering member being positioned nearer a central portion of the seat back than the superficial skin member portion at the outer peripheral face position of the seat back;

wherein a first of the divided parts of the cover member comprises a first joining portion, wherein a second of the divided parts of the cover member comprises a second joining portion, and wherein the covering member is joined to the back plate by a fastener extending through the first and second joining portions and into the back plate; and wherein the back plate comprises a frame fixing portion, wherein the fastener is inserted through the frame fixing portion, and wherein the frame fixing portion is formed so as to align with a member of a frame of a vehicle so as to conceal the fastener.

7. A vehicle seat comprising:

a plate having opposing first and second faces and a terminal end;

a cushion member on the first face of the plate;

a superficial skin member covering the cushion member, wherein the superficial skin member has a fringe extending over the terminal end;

a fringe treatment joining the fringe to the second face of the plate; and, a covering member, wherein the covering member covers the fringe treatment and the terminal end such that the fringe is between the terminal end and the covering member and such that a superficial skin member portion is provided at an outer periphery of the superficial skin member, and wherein the covering member is positioned between a central portion of the second face and the outer periphery of the superficial skin member;

wherein the covering member is joined to the plate by a fastener, wherein the plate comprises a frame fixing portion, wherein the fastener is inserted through the frame fixing portion, and wherein the frame fixing portion is formed so as to align with a member of a frame of a vehicle so as to conceal the fastener.

8. A vehicle seat according to claim 7, wherein the fringe treatment comprises fasteners that fasten the superficial skin member to the plate.

9. A vehicle seat comprising:

a plate having opposing first and second faces and a terminal end;

a cushion member on the first face of the plate;

a superficial skin member covering the cushion member, wherein the superficial skin member has a fringe extending over the terminal end;

a fringe treatment joining the fringe to the second face of the plate; and, a covering member, wherein the covering member covers the fringe treatment and the terminal end such that the fringe is between the terminal end and the covering member and such that a superficial skin member portion is provided at an outer periphery of the superficial skin member, and wherein the covering member is positioned between a central portion of the second face and the outer periphery of the superficial skin member;

wherein the covering member is joined to the plate by a fastener, wherein the covering member comprises at least first and second separate parts, wherein the first part comprises a first joining portion, wherein the second part comprises a second joining portion, and wherein the fastener is inserted through the covering member, the first and second joining portions, and into the plate so as to fasten the covering member to the plate and so as to join the first and second parts.

10. A vehicle seat comprising:

a plate having opposing first and second faces and a terminal end;

a cushion member on the first face of the plate;

a superficial skin member covering the cushion member, wherein the superficial skin member has a fringe extending over the terminal end;

a fringe treatment joining the fringe to the second face of the plate; and, a covering member, wherein the covering member covers the fringe treatment and the terminal end such that the fringe is between the terminal end and the covering member and such that a superficial skin member portion is provided at an outer periphery of the superficial skin member, and wherein the covering member is positioned between a central portion of the second face and the outer periphery of the superficial skin member;
wherein the covering member is joined to the plate by a fastener, wherein the plate comprises a frame fixing portion, wherein the covering member comprises at least first and second separate parts, wherein the first part comprises a first joining portion, wherein the second part comprises a second joining portion, wherein the fastener is inserted through the covering member, the frame fixing portion, and the first and second joining portions so as to fasten the covering member to the plate and so as to join the first and second parts, and wherein the frame fixing portion is formed so as to align with a member of a frame of a vehicle so as to conceal the fastener.

11. A vehicle seat comprising:

a plate having opposing first and second faces, a frame fixing portion, and an outer periphery;

a cushion member on the first face of the plate;

a superficial skin member covering the cushion member and extending around the outer periphery of the plate to the second face, wherein the superficial skin member has a fringe treatment joining the fringe to the second face of the plate;

a covering member, wherein the covering member covers the fringe treatment of the superficial skin member such that a superficial skin member portion is provided at an outer periphery of the superficial skin member, and wherein the covering member is positioned between a central portion of the second face and the outer periphery of the superficial skin member; and, a fastener inserted through the covering member and the frame fixing portion so as to fasten the covering member to the plate, wherein the frame fixing portion is formed so as to align with a member of a frame of a vehicle so as to conceal the fastener;

wherein the covering member comprises at least first and second separate parts, wherein the first part comprises a first joining portion, wherein the second part comprises a second joining portion, and wherein the fastener is inserted through the covering member, the frame fixing portion, and the first and second joining portions so as to fasten the covering member to the plate and so as to join the first and second parts.

12. A vehicle seat according to claim 11, wherein the fastener comprises a first fastener, and wherein the fringe treatment comprises second fasteners that fasten the superficial skin member to the plate.

* * * * *